June 29, 1926.　　　　　　　　　　　　　　　　　　　　1,590,259
J. F. SHELTON
AUTOMATIC HAY SHAKER AND SEED SIFTER
Filed Dec. 16, 1924

WITNESSES

INVENTOR
J. F. Shelton,
BY
ATTORNEYS

Patented June 29, 1926.

1,590,259

UNITED STATES PATENT OFFICE.

JACK FINNER SHELTON, OF MEMPHIS, TENNESSEE.

AUTOMATIC HAY SHAKER AND SEED SIFTER.

Application filed December 16, 1924. Serial No. 756,271.

This invention relates to an automatic hay shaker and seed sifter for use on mowing machines.

The object of the invention is the provision of a device of this character which is actuated from the cutter bar or by the means which operates the cutter bar and which is effective to separate the seed from the hay and to displace the hay rearwardly of the device and onto the ground.

A further object is the provision of a device of the character specified and having the advantages enumerated and which is adapted for attachment on practically any type of mowing machine without the necessity of modifying its construction in any way.

A still further object is the provision of a device of this character wherein the cutter bar of the mowing machine may be raised without lifting back the seed pan, the operating bar for the sifting screen being mounted to automatically move as may be required when the cutter bar is raised.

Other objects and advantages reside in certain novel features of the construction, arrangement and combination of parts which will be hereinafter more fully described and particularly pointed out in the appended claims, reference being had to the accompanying drawings forming a part of this specification, and in which:—

Figure 1:
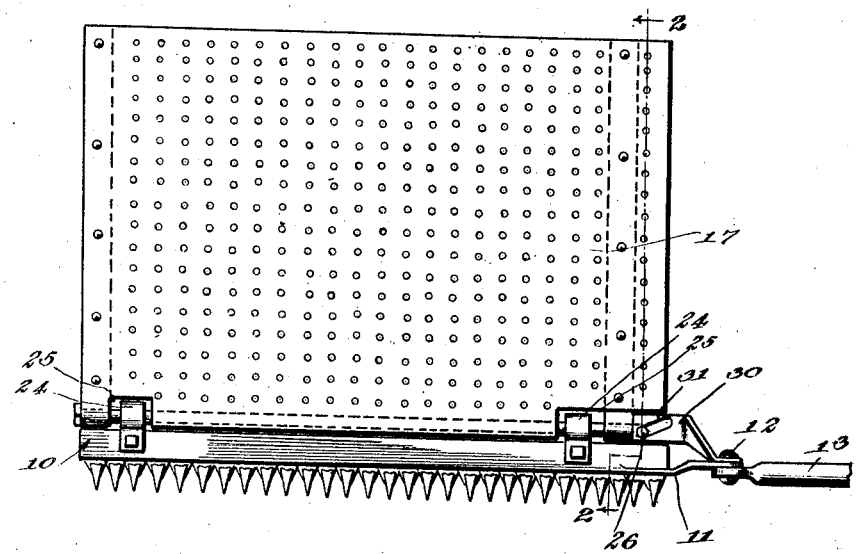
Figure 1 is a plan view showing one embodiment of the invention.
Figure 2:
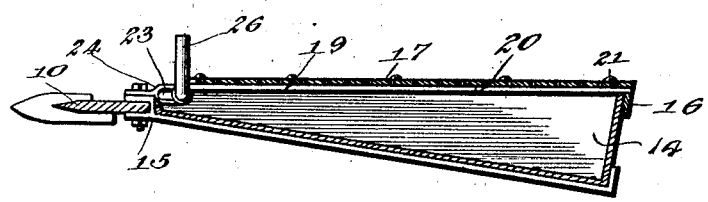
Figure 2 is a view in longitudinal vertical section on the line 2—2 of Figure 1, parts being omitted for the sake of simplicity and illustration.
Figure 3:
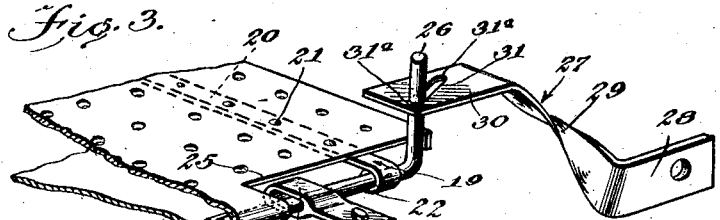
Figure 3 is a fragmentary perspective view illustrating the means for shifting the sifting screen.
Figure 4:
Figure 4 is a fragmentary detail perspective view of one of the connecting bars employed for fixing the sifting screen to its operating rod.

Referring to the drawings, the numeral 10 designates a cutter bar of a mowing machine which has an arm 11 pivotally connected, as at 12, with an operating element 13, the operating element reciprocating the cutter bar in the usual manner. A seed pan 14 is supported by brackets 15 on the cutter bar 10 and the upper edge of the seed pan is reinforced by a strip 16 which is secured to the seed pan and which projects just above the edge.

A sifting screen 17 is mounted for shifting movement on the seed pan, the sifting screen having a bearing on the reinforcing or wearing strip 16. This sifting screen may be of any suitable construction and is shown for the sake of illustration as consisting of a metal plate having openings which permit the passage of seed into the seed pan but which prevents the passage of hay thereinto. The forward edge of the sifting screen is wrapped around the central portion of an operating rod 18 and is further secured to this rod by attaching bars 19 having portions 20 riveted or otherwise secured, as at 21, to the screen 17 and also having sleeves or eyes 22 embracing and fixed to the operating rod. The operating rod is loosely mounted in slots 23 formed in bearing brackets 24 fixed to the cutter bar. The mounting of the rod 18 in the bearing brackets 24 is such that the rod may move axially back and forth; that is, transversely of the seed pan, or may move longitudinally of said seed pan or may turn or move angularly. The forward edge of the screen 17 is notched, as at 25, to permit the rod and the screen to move transversely and longitudinally of the seed pan or to be turned to uncover the seed pan.

At one end the rod 18 is provided with a crank arm 26. An operating bar 27 is provided and has a flat vertical portion 28 connected to the pivot 12 which also serves to connect the pitman or operating element 13 with the cutter bar. This same operating bar 27 has its intermediate portion bent and twisted, as at 29, and has an upper horizontal end portion 30 formed with an inclined slot 31 in which the crank arm 26 is fitted.

With this arrangement when the cutter bar is being reciprocated the operating bar 30 is also moved back and forth. The back and forth movement of the operating bar causes the rod 18 and consequently the screen 17 to shift back and forth transversely of the seed pan and also to shift back and forth longitudinally of the seed pan since the ends 31ª of the slot 31 alternately engage the crank arm 26 of the rod 18 to effect a back and forth transverse movement and since the inclination of the slot 31 causes the crank arm 26 and consequently the rod 18 to move and the screen 17 to shift back and forth longitudinally of said pan. Of course, it is to be understood that the crank arm is held rigidly upright due to the fact that it is fixed to the attaching bars 19 and constrained to operate in the slots 23 of the bearing brackets 24. The back and forth transverse and horizontal shifting movement of the screen thoroughly shakes the hay and seed which falls thereon and consequently effects the separation of the seed from the hay. The seed falls through the openings of the screen 17 into the seed pan 14 and the hay is moved back over the rear edge of the screen and falls to the ground in the rear of the seed pan. Although the operating bar 27 is held against horizontal swinging movement it may be swung vertically about the pivot or bolt 12 to disengage it from the crank arm 26 when it is desired to lift up the screen 17 to gain access to the interior of the seed pan.

From the foregoing it will be observed that the present invention provides an automatic attachment for mowing machines which shakes the seed loose from the hay, which sifts the seed into the pan, which shakes or displaces the hay off the sifting screen and to the rear of the pan, which is adapted to fit any make of mower, which may be readily and easily attached and detached without drilling holes or otherwise modifying the construction of the mowing machine, which allows the cutter bar to be raised without lifting back the seed pan and which allows the operating bar 27 to be disengaged from the crank arm 26 when the mower is not cutting.

I claim:

1. The combination with a cutter bar of a mowing machine and means for operating the bar of a seed pan carried by the cutter bar, a shifting screen overlying the seed pan, means for mounting the screen for shifting movement over the seed pan, and means operable from the means which operates the cutter bar for shifting said sifting screen.

2. The combination with a cutter bar of a mowing machine and means for operating the bar of a seed pan carried by the cutter bar, a sifting screen overlying the seed pan, means for mounting the screen for shifting movement transversely and longitudinally over the seed pan, and means operable from the means which operates the cutter bar for shifting said sifting screen.

3. The combination with a cutter bar of a mowing machine and means for operating the bar of a seed pan carried by the cutter bar, a shifting screen overlying the seed pan, means for mounting the screen for shifting movement transversely and longitudinally over the seed pan and comprising a rod fixedly connected with the screen and bearings fixed to the cutter bar and having slots loosely receiving the rod, and means operable from the means which operates the cutter bar for shifting said sifting screen transversely and longitudinally over the pan.

4. The combination with a cutter bar of a mowing machine and means for operating the bar of a seed pan carried by the cutter bar, a shifting screen overlying the seed pan, means for mounting the screen for shifting movement transversely and longitudinally over the seed pan and comprising a rod fixedly connected with the screen and bearings fixed to the cutter bar and having slots loosely receiving the rod, means operable from the means which operates the cutter bar for shifting said sifting screen transversely and longitudinally over the pan and including an operating bar connected with the means which operates the cutter bar, said operating bar having an inclined slot therein, said rod having an offset end received in said slot.

JACK FINNER SHELTON.